United States Patent [19]
Leonard

[11] 3,733,956
[45] May 22, 1973

[54] SCALE FINGERING SLIDERULE
[76] Inventor: Verna M. Leonard, 6353 North Blackstone, Fresno, Calif. 93721
[22] Filed: Aug. 13, 1971
[21] Appl. No.: 171,562

[52] U.S. Cl. ........................84/471, 84/478, 84/485
[51] Int. Cl. .............................................G09b 15/02
[58] Field of Search......84/470-473, 477-483, 485

[56] References Cited
UNITED STATES PATENTS

| | | | |
|---|---|---|---|
| 877,259 | 1/1908 | Thrash | 84/485 X |
| 201,030 | 3/1878 | Mason | 84/481 |
| 2,188,098 | 1/1940 | Bostelmann | 84/485 X |
| R24,195 | 8/1956 | Wallace | 84/485 X |
| 3,350,973 | 11/1967 | Weis et al. | 84/478 |
| 3,621,750 | 11/1971 | Leonard | 84/471 |

Primary Examiner—Richard B. Wilkinson
Assistant Examiner—John F. Gonzales
Attorney—Knox & Knox

[57] ABSTRACT

A scale fingering sliderule for showing the proper sequential fingering of the keys in various scales on a keyboard, the slide holder or body of the item being essentially an elongated panel, the lower edge of which fits behind the keys on the keyboard and is thereby supported in vertical position. The holder has chromatic scale indicia adjacent the lower edge portion to identify all the keys in the adjacent part of the keyboard, while a slider, as one of a set of sliders, on said panel, identifies the tones of at least one scale with the scale intervals and the proper fingering in ascending or descending scale progression. A plurality of sliders, for different scale progressions, are supported in channels provided on both sides of the holder, only one at a time being exposed on the front side of the holder in properly adjusted position relative to the aforementioned chromatic scale indicia on the holder to indicate the keys to be struck and the fingering sequence numerically.

2 Claims, 3 Drawing Figures

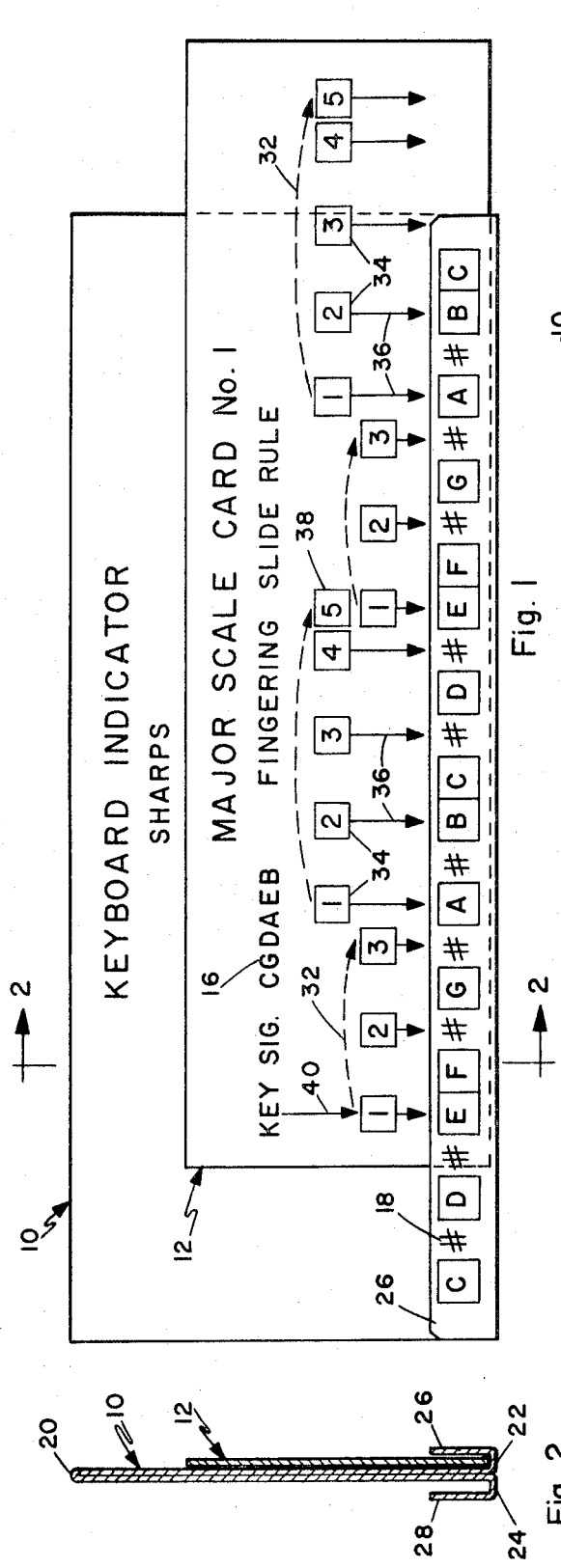
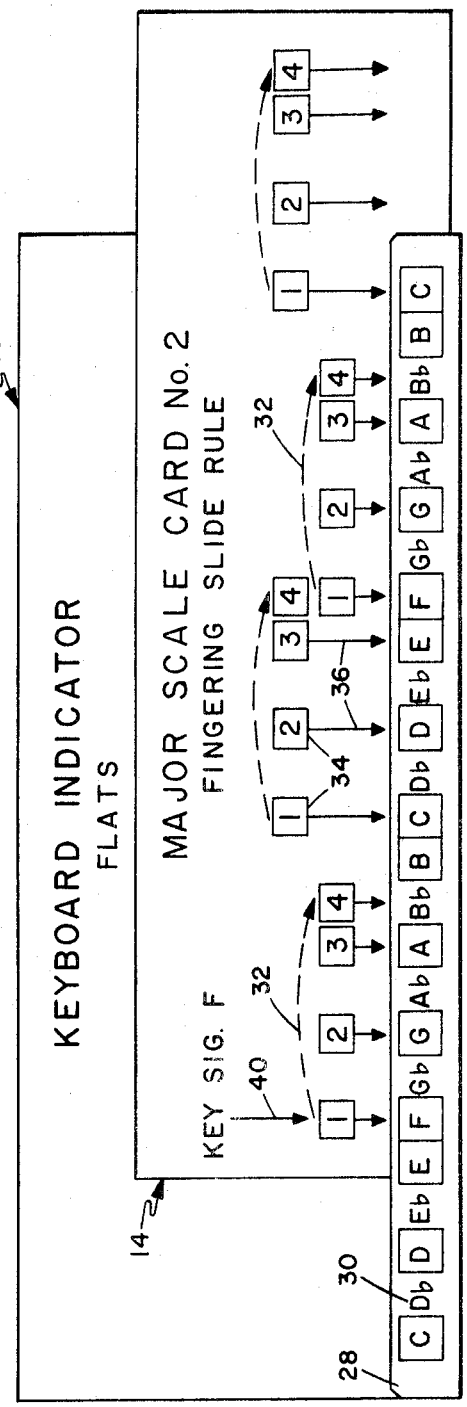

SCALE FINGERING SLIDERULE

BACKGROUND OF THE INVENTION

Many items have been heretofore developed for indicating the names of the actual keyboard keys and the device of placing such an item, usually an elongated card, behind the keys on a keyboard is well known. The general principle for sequencing of the finger action is also reasonably well established among musicians and the teachers. Fingering techniques do differ in accomplished musicians but the great importance of facile fingering is recognized in relation to both ease in playing and ability to play rapid passages. Even so, the prior art is not known to include a sliderule type fingering guide showing, for a particular scale or scales, the numbered fingering sequences positioned immediately above the actual keyboard keys with the latter positively named.

SUMMARY OF THE INVENTION

As claimed, this invention is essentially a cardlike holder to fit behind the keys on a keyboard and elongated to span one or more octaves with chromatic scale represented on the holder adjacent the lower edge thereof with intervals coinciding with the corresponding intervals between the keys on the keyboard, one side of the holder showing the chromatic scale in sharps and the opposite side showing flats. The holder has a channel on each side to retain lower edge portions of a plurality of slides which, exposed one at a time, show scale tone progressions with an easily read scale fingering guide for a chosen scale progression. As disclosed and claimed the holder is a single panel folded along a central horizontal line and the chromatic scale indicia are placed behind upwardly returned edge portions which define outer rails of channels for the slides.

BRIEF DESCRIPTION OF THE DRAWINGS

FIG. 1 is a front elevational view of the fingering sliderule with one of the cards of slides positioned to show the fingering for a particular scale, the tones in the major scale of E.

FIG. 2 is a vertical cross sectional view taken on the line 2—2 in FIG. 1.

FIG. 3 is a view similar to FIG. 1 and showing a further example of a card used to show fingering for a different scale progression, the key of F major.

DETAILED DESCRIPTION OF A PREFERRED EMBODIMENT

The illustrated preferred embodiment of this invention includes a holder, generally referred to by the numeral 10 and a set of slides, two representative slides being illustrated at 12 and 14. Since in the practice of this invention the user may develop slides for an indefinite number of scales, no attempt is made to illustrate all the different possible scales but the two scales 12 and 14 amply illustrate the essential elements of the scales, it being recognized that some slides are adapted for multiple scale use, as for example the slide 12 which is useful in guiding the fingering for the scale progressions of several keys noted at 16 on the slide as C, G, D, A, E and B, in each case related to the chromatic scale 18 in sharps on the holder 10.

The holder 10 is preferably constructed from a single elongated panel of sheet material bent double at 20 and each longitudinal edge return bent at 22, 24 to provide outer rails 26, 28 of channels on opposite sides of the holder and at the lower edge thereof. The chromatic scale is represented on the rails 26 and 28 in sharps on one side, as already noted, at 18 in FIG. 1 and in flats on the opposite side on the rail 28 as shown at 30 in FIG. 3.

Only one face of one slide need be exposed at one time and the other slides of the set, or at least some of them, may be stacked in the remaining space in the channels of the holder. Ordinarily the holder with the adjusted slide will be inserted behind the keys on a keyboard with the chromatic scale 18 or 30 aligned with the keyboard keys.

Fingering guide means is in the form of arrows 32 and boxed numerals 1 to 5, indicated at 34 with depending arrows as indicated at 36. The boxed numerals 34 are readily translated or interpreted as thumb and finger sequences and the "thumb under" movement required is visually suggested by the positioning of the boxed "1" numeral under "4" or "5," this being accomplished by raising the whole "handful" as indicated at 38, for example, the accompanying arrow 32 being of course also raised along with the "handful" of boxed numerals. The term "handful" is borrowed from a noted author on piano playing and could also be expressed as "hand position."

Obviously the slides can be shifted along the holders as required and the arrow 40 with the notation "Key Signature" clearly suggests the necessary positioning of the slide so that the root tone of the slide corresponds positionally with the key of the scale progression desired to be played as represented in the chromatic scale 18 or 30 and of course as found on the keyboard when the holder is properly positioned thereon.

Having described my invention and the mode of using the same what I claim as my invention and to secure by Letters Patent is:

1. An appliance for use with a keyboard, comprising:
    a holder having two returned lower edge portions defining front and back channels on opposite sides of the holder, said holder being reversible so that either channel can be the front channel in use;
    a set of cards stacked in said channels with a selected card visibly exposed in the front channel;
    each of said cards having scale indication means thereon directly pointing out the scale intervals and positions of the keyboard keys for a particular scale and also having fingering indicator means showing a proper fingering of the keyboard keys for said particular scale.
2. An appliance according to claim 1 wherein said returned lower edge portions have chromatic scale indicating means to denominate all the adjacent black keys in the keyboard as sharps on one side of the holder and as flats on the other side of the holder so that the cards can be accordingly grouped in said channels and exposed selectively for use.

* * * * *